Patented Apr. 18, 1933                                                        1,904,529

UNITED STATES PATENT OFFICE

WILHELM PUNGS AND KARL EISENMANN, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

MANUFACTURE OF ARTIFICIAL MASSES

No Drawing.   Application filed February 14, 1929, Serial No. 340,014, and in Germany February 14, 1928.

In the application for a Patent Ser. No. 271,401, filed April 19, 1927, applicants have described a process for the production of artificial compositions, such as lacquers, films and the like, in which condensation products of urea and formaldehyde are combined, in presence of solvents, with nitrocellulose, which may, when required, be partly replaced by high grade natural or artificial resins, and with vegetable oils which have been treated with oxidizing gases at elevated temperatures.

We have now found that, in such compositions the vegetable oils may also be replaced by animal oils treated in the same manner, especially fish oils of any kind, either alone or in admixture with the first-named oils. The advantage in the employment of animal oils consists primarily in that they can be converted into highly viscous products, in a far shorter time than the oils referred to above, by treatment with oxidizing gases at an elevated temperature. Moreover, the majority of the animal oils, and especially the various kinds of fish oil, are cheaper than vegetable oils. Thus, for example, cod oil can be converted, by a treatment with air for only 4 hours and at 150° to 160° C. into a highly viscous product of the desired properties, whereas, in contrast thereto, a treatment of from 10 to 12 hours is necessary in the case of linseed oil or castor oil. The production of clear transparent products from urea-formaldehyde condensation products nitrocellulose and the oils treated with oxidizing gases, is greatly facilitated by the conjoint use of solvents of high and low boiling points.

The odor of the products obtained by treating animal or vegetable oils with oxidizing gases at an elevated temperature, can be removed or considerably improved by allowing hydrogen to act on the oils, in presence of hydrogenating catalysts, in any known or suitable manner, before or after the treatment with oxidizing gases, but in such cases, the treatment must be performed under such mild conditions that the resulting products do not solidify, or deposit solid constituents at room temperature.

It is possible, according to this invention, to increase the relative proportion of urea-formaldehyde condensation products in the lacquer without the said drawbacks resulting. The gloss of the coatings or films prepared with the lacquers is thereby increased and in contrast to the usual nitrocellulose resin lacquers, they possess a considerable power of withstanding liquid hydrocarbons, such as benzine, or benzene.

The lacquers may be applied by spraying, dipping or brushing, and they may be mixed with plasticizers or gelatinizing agents, such as are known in the art for the preparation of lacquers, varnishes and the like. Owing to their resistance to hydrocarbons they are particularly suitable as lacquers for motor cars. The lacquer solutions may also be treated in any suitable apparatus and in any known and suitable manner, for the preparation of artificial masses of celluloid character, concentrated solutions being preferably employed for this purpose. Particularly suitable solvents for these lacquers comprise mixtures of lower aliphatic alcohols, especially n-butyl and isobutyl alcohol, and the acetic esters of the same. Hydrocarbons may also be added as diluents. The production of clear transparent products from urea formaldehyde condensation products, nitrocellulose, and the oils treated with oxidizing gases, is greatly facilitated by the conjoint use of solvents of high and low boiling points. If desired, solid inorganic fillers, such as ground slate, kieselguhr and the like materials and/or dyestuffs or pigments may be incorporated with the artificial compositions in the usual manner.

A particular advantage of the artificial masses and of the coatings prepared with solutions thereof in accordance with the present or our beforementioned prior application consists in that they show a particularly high insulating power and are consequently highly valuable for use as insulating lacquers or insulating materials, such as, for example, knobs, plates, pressed articles and the like or for covering wires, coils, condenser plates and the like.

The following examples will further illustrate the nature of this invention which however is not restricted thereto. The parts are by weight.

*Example 1*

140 parts of a 43 per cent solution in isobutyl alcohol, of a resinous urea-formaldehyde condensation product are mixed with a solution of 60 parts of nitrocellulose and 45 parts of shark oil (previously treated with air at 150° to 160° C.) in 100 parts of butyl acetate, 200 parts of ethyl lactate, 300 parts of ethyl alcohol and 300 parts of toluene. A lacquer is obtained which dries clear and transparent.

A shark oil may be replaced by whale, seal, or sardine oil.

*Example 2*

A mixture of equal parts of castor oil and cod oil is treated with hydrogen for 10 minutes at 160° C., in the presence of a nickel catalyst, the catalyst being then removed and air blown through the mixture for about 4 hours at 150° to 160° C. in a suitable apparatus.

60 parts of the resulting highly viscous product and 60 parts of nitrocellulose are dissolved in the solvent mixture described in Example 1, and are mixed with 180 parts of a 33 per cent solution, in n-butyl alcohol, of a hardened urea formaldehyde condensation product to form a lacquer which, when dry, leaves a clear elastic coating on the base to which it has been applied.

The procedure is similar when urea-formaldehyde condensation products are employed which are in a still incompletely hardened condition, and when another resin, such as a copal or other compatible natural or artificial resin is added.

What we claim is:—

1. A composition comprising nitrocellulose, a condensation product of urea-formaldehyde, an animal oil selected from the class consisting of cod oil, shark oil, whale oil, seal oil and sardine oil which has been pretreated with an oxidizing gas at an elevated temperature, and an organic solvent for the ingredients including a substance selected from the class consisting of lower aliphatic alcohols and the acetic esters thereof.

2. A composition comprising nitrocellulose, a condensation product of urea-formaldehyde, an animal oil selected from the class consisting of cod oil, shark oil, whale oil, seal oil and sardine oil which has been pretreated with an oxidizing gas at an elevated temperature and deodorized by treatment with hydrogen, and an organic solvent for the ingredients including a substance selected from the class consisting of lower aliphatic alcohols and the acetic esters thereof.

3. A composition comprising nitrocellulose, a condensation product of urea-formaldehyde, an animal oil selected from the class consisting of cod oil, shark oil, whale oil, seal oil and sardine oil which has been blown with air at a temperature between 170° C. and 180° C., and a solvent for the ingredients including a substance selected from the class consisting of lower aliphatic alcohols and the acetic esters thereof.

4. A composition comprising nitrocellulose, a condensation product of urea-formaldehyde, castor oil, an animal oil selected from the class consisting of cod oil, shark oil, whale oil, seal oil and sardine oil which has been pretreated with an oxidizing gas at an elevated temperature, and an organic solvent for the ingredients including a substance selected from the class consisting of lower aliphatic alcohols and the acetic esters thereof.

5. A composition comprising nitrocellulose, a solution of a condensation product of urea-formaldehyde in isobutyl alcohol, and an animal oil selected from the class consisting of cod oil, shark oil, whale oil, seal oil and sardine oil which has been pretreated with an oxidizing gas at an elevated temperature.

In testimony whereof we have hereunto set our hands.

WILHELM PUNGS.
KARL EISENMANN.